(12) United States Patent
Fujii

(10) Patent No.: US 7,831,320 B2
(45) Date of Patent: Nov. 9, 2010

(54) PARAMETER SETTING DEVICE

(75) Inventor: Yutaka Fujii, Mishimi (JP)

(73) Assignee: Omron Corporation, Kyoto (JP)

( * ) Notice: Subject to any disclaimer, the term of this patent is extended or adjusted under 35 U.S.C. 154(b) by 1066 days.

(21) Appl. No.: 11/362,371

(22) Filed: Feb. 27, 2006

(65) Prior Publication Data

US 2006/0253838 A1    Nov. 9, 2006

(30) Foreign Application Priority Data

Feb. 28, 2005 (JP) .......................... P2005-055050
Feb. 14, 2006 (JP) .......................... P2006-036623

(51) Int. Cl.
*G06F 19/00* (2006.01)

(52) U.S. Cl. ........................................ 700/87; 717/176

(58) Field of Classification Search ................ 700/18, 700/19, 22–25, 82, 87, 94, 162; 717/176, 717/135, 124, 170; 219/69.11, 69.12; 702/188; 318/119; 714/11; 711/100, 103–106; 709/223
See application file for complete search history.

(56) References Cited

U.S. PATENT DOCUMENTS

| | | | | |
|---|---|---|---|---|
| 5,305,226 A | * | 4/1994 | Nien et al. ................... | 700/162 |
| 6,236,399 B1 | * | 5/2001 | Nishiyama et al. .......... | 715/810 |
| 6,248,975 B1 | * | 6/2001 | Lanouette et al. ...... | 219/130.21 |
| 6,563,085 B2 | * | 5/2003 | Lanouette et al. ......... | 219/130.5 |
| 7,034,710 B2 | * | 4/2006 | Falada et al. ................. | 340/679 |
| 7,272,453 B2 | * | 9/2007 | Dax et al. ..................... | 700/23 |
| 7,319,765 B2 | * | 1/2008 | Suyama et al. .............. | 381/119 |
| 2003/0214666 A1 | * | 11/2003 | Osada ........................ | 358/1.13 |
| 2004/0181777 A1 | * | 9/2004 | Fam ........................... | 717/114 |
| 2005/0086560 A1 | * | 4/2005 | Okeda et al. .................. | 714/11 |
| 2005/0144594 A1 | * | 6/2005 | Yamazaki .................... | 717/136 |

FOREIGN PATENT DOCUMENTS

JP    2002-268730    9/2002

* cited by examiner

*Primary Examiner*—Kidest Bahta
(74) *Attorney, Agent, or Firm*—Foley & Lardner LLP

(57) ABSTRACT

A parameter setting device which can meet a case where the version of an actual machine is inconsistent with the version of a tool for setting the unit parameter and which allows user to set the parameters without being conscious of consistency or inconsistency of the version between the both is provided. This parameter setting device comprises a device for acquiring unit configuration information indicating what units constitute the same device and information about types of the respective units and their version and a device for specifying a machine type information definition file which can be met based on that acquired the unit of the actual machine type and version information and a device for reading out that specified machine type information definition file which can be met and displaying the parameter setting screen based on that file.

13 Claims, 15 Drawing Sheets

Fig. 3

| Type | Version | Updated version | Machine type information definition file name |
|---|---|---|---|
| Type 1 | 1.0 | 0 | Type 1 V1 0.xml |
| Type 2 | 1.1 | 1 | Type 1 V1 1.xml |
| Type 3 | 1.0 | 1 | Type 2 V1 0.xml |

| Parameter Edition | | | | |
|---|---|---|---|---|
| Displayed Parameter Group (G) | All Parameters ▼ | | | |
| Items | Setting Value | Unit | | |
| Port1: Transmission Delay Arbitrary Setting T | 0 | ms | | |
| Port1: CTS Control | No | | | |
| Port 1: 1:N/1:1 Procedure | 1:N Procedure | | | |
| Port 1: Frame Format | itial Value (A Mod | | | |
| Port 1: Upper Link Machine No. | 0 | | | |
| Port 1: Standard Code | 0 | | | |
| Port1: End Code | 0 | | | |
| Port1: Start Code Absence/Presence | No | | | |
| Port 1: End Code Absence/Presence | No | | | |
| Port 1: Reception Data Quantity | 0 | Byte | | |
| Port1: NT Link (1:N) Maximum Machine Number | 0 | | | |
| Port 1: Response Time Out Monitor Time | 0 | ms | | |
| Port 1: Protocol Macro Transmission Type | Half duplex | | | |

Help

Transmission [Unit – PC] Transmission [PC – Unit] Verification(M)   Reset(R)

Return To Default (E)   OK(O)   Cancel(C)

Fig. 10

| Parameter Edition | | | X |
|---|---|---|---|
| Displayed Parameter Group (G) | All Parameters ▼ | | |

| Items | Setting Value | Unit |
|---|---|---|
| Port1: Transmission Delay Arbitrary Setting Ti | 0 | ms |
| Port1: CTS Control | No | |
| Port1: Upper Link Machine No. | 0 | |
| Port 1: 1:N/1:1 Procedure | | |
| Port1: Protocol Macro Transmission Type | Half Duplex | |
| Port 1: Protocol Macro Transmission Data Maxim | 0 | Byte |
| Port 2: Arbitrary Setting Presence/Absence | Standard | |
| Port 2: Serial Communication Mode | ial Value (Upper L | |
| Port 2: Data Length | 7 bits | |
| Port 2: Stop Bit | 2 bits | |
| Port 2: Parity | Even | |
| Port 2: Transmission Speed | tial Value (9600 b | |
| Port 2: Upper Link Transmission Delay Time | nitial Value (0 ms | ms |

Help ◄ ►

<Default Value> Absence

<Setting Address> Channel: D30303, Bits: 15
<Input Form> List

| Transmission [Unit – PC] | Transmission [PC – Unit] | (Verification(M)) | OK(O) | Reset(R) |
|---|---|---|---|---|
| Return To Default (E) | | | | Cancel(C) |

Fig. 14

PARAMETER SETTING DEVICE

This application claims priority from Japanese patent applications JP P2005-055050, filed on Feb. 28, 2005, and JP P2006-036623, filed on Feb. 14, 2006. The entire contents of each of the aforementioned applications are incorporated herein by reference.

BACKGROUND OF THE INVENTION

1. Field of the Invention

The present invention relates to a parameter setting device and more particularly to a device for setting parameters to an apparatus having multiple machine types or versions like a unit which constitutes a control unit of programmable logic controller (PLC) or the like.

2. Description of the Related Art

The PLC for controlling factory automation (FA) system installed on manufacturing site of workshop or the like comprises CPU unit which executes arithmetic operation based on a control program, an input unit which is connected to a sensor or a switch and inputs ON/OFF signals thereof as an input signal, an output unit which is connected to an output device such as an actuator and a relay and outputs an output signal to them, a communication unit which is connected to a terminal unit located at upper level for exchanging information, and a power source units for supplying power to each unit.

Control of the CPU unit in the PLC includes cyclically repeated processing of writing a signal input through the input unit into an I/O memory of the CPU unit (IN refresh), a logical operation (execution of arithmetic operation) based on a user program constituted of preliminarily registered user program description languages (for example, ladder language), writing a result of the arithmetic operation into the I/O memory and then outputting to the output unit (OUT refresh), exchanging data with other PLC on communication network through communication unit and exchanging data with an outside apparatus through a communication port provided on the CPU unit (peripheral processing). In the meantime, the IN refresh and OUT refresh may be sometimes carried out in batch (I/O refresh). In this case, the CPU unit executes the I/O refresh processing, user program execution processing, and peripheral processing cyclically.

The CPU unit includes a program memory which stores a control program, a data memory which stores the input signal input by the input unit and output signal as a result of arithmetic operation of the control program and a processing processor which executes arithmetic operation or the like based on the control program. The control program in the CPU unit is created by description with ladder language expressed with, for example, a ladder diagram (ladder chart) by PLC user's operating a programming tool unit. Then, the created user program is downloaded to an object CPU unit by converting symbols of the ladder diagram to commands with the programming tool unit while specifying an operand corresponding to each CPU unit. The processing processor of the CPU unit sequentially reads out a command of the user program from the program memory, and information of the input signal from the data memory based on an address of the memory following an operand of this command, executes logical operation about this data based on the user program, stores a result of the operation in the data memory and outputs the stored operation result to the output unit as an output signal. The processing processor of the CPU unit executes cyclically this input signal reading processing (IN refresh processing), a user program execution processing and an output processing (OUT refresh processing).

Prior to an actual activating the PLC, sometimes a parameter setting necessary for the operation of the unit and other respective settings are performed to the CPU unit, communication unit, I/O unit, position control unit, motion controller unit and other various units as well as downloading of the above-described user program. Such settings are carried out using a special tool which is activated on a personal computer.

The PLC units include a CPU unit, power source unit, input unit, output unit, I/O unit, high function unit, communication unit and other various units. Each of these units is provided with a certain type depending on its function, performance and the like. Often there exists a plurality of units of different versions although their types are the same. The types and versions are determined by human. Some manufacturer uses a designation "type" and "machine type" or "model" which is a concept which combines the type and version. The reason why a plurality of machine types or version exist is that the version of the units which constitute the PLC is updated due to development of a new machine type equipped with new function, improvement of the specification and intensification of loaded software accompanying advancement and diversification of manufacturing method and progress of technology. Although, in this updating of the version, the processing speed is improved and new functions are added, the functions of the units which constitute the PLC of old version are transferred to new version unit while keeping compatibility with existing machine types. Therefore, user program used by older version PLC can be loaded on new version PLC as it is. The range of improvement by intensifying the functions such that they can be used by the existing units also while keeping the functions of the old version is usually an identical range which some type covers. If usability of the user program of old version is not available as it is by eliminating functions used in old version, usually, the machine type is changed. That is, the respective units which constitute the PLC updated in its version not only can be used as a product corresponding to the new version but also can be used as a substitute for an old version product.

The same thing can be said about setting of parameters to a unit. The kind of the parameters to be set up is not only different depending on the unit type but also new parameters are added each time when the version is updated. This is because the kind of the parameters which should be set up is increased or the range which can be selected is expanded even if the item to be set up is the same accompanied by addition of the function or improvement of processing speed. In this parameter setting, as described above, the parameters which can be used or set in the old version are transferred to all units updated in version. In the meantime, the technology for setting/editing the parameters has been disclosed in, for example, the patent document 1. Patent document 1: Japanese Patent Application Laid-Open Publication No. 2002-268730

Usually, the version of a tool for setting the parameter (parameter setting device) is updated corresponding to the updated version of the unit. The reason is as follow: if the quantity of setting items is increased by expansion of the function of the PLC unit of new version, the parameter setting device of old version cannot meet such expanded function (setting items) and thus, a new parameter setting device corresponding to that expanded function is needed to support that expanded function.

By the way, even if a "unit" and a "parameter setting device" are both updated in their versions, user do not always use such updated unit. That is, if the content of such an updated version is not necessary for user, often he/she will not purchase that updated unit. However, the updating of the version sometimes occurs unexpectedly of user, for example, when a unit currently in use is in trouble and thus is replaced with a new unit of the same type, it comes that he/she cannot help using an updated unit. Further, the version of the parameter setting device which user possesses is not always kept in the updated version. As a consequence, such a phenomenon that the version of the parameter setting device is not consistent with the version of a unit to be set by the parameter setting device can occur.

Unless the version of the parameter setting device is consistent with the version of the unit, malfunction may occur. That is, even if the version of the parameter setting device is updated to the newest one, when an actual unit is actuated under an older version, the unit may not operate properly when a parameter described in a definition file of the parameter setting device is written into the unit.

An object of this invention is to provide a parameter setting device which can meet a case where the version of an actual machine is inconsistent with the version of a parameter setting device for setting the unit parameter, so that the parameter can be set up without an error even if the parameter setting device which sets the parameter is in an old version, and the unit of the actual machine is in a new version and which allows a user to set the parameters without being conscious of consistency or inconsistency of the version between the both.

To achieve the above-described object, according to an aspect of the invention, there is provided a parameter setting device having a plurality of machine type definition file that defines a parameter for setting each of units constituting a programmable controller and being designed to set up a parameter for a unit having upper compatible in version based on the machine type definition file, comprising: a means for displaying a parameter setting screen based on the machine type definition file corresponding to a unit for inputting a parameter for the unit; a downloading means that executes a downloading of the parameter set with the parameter setting screen to the programmable controller including the unit; a means for comparing a version of the machine type definition file with a version of the unit; a means for displaying an error message when the downloading is prohibited, wherein the means for downloading executes the downloading when the version of the machine type definition file with a version of the unit are same or the version of the unit is newer, while prohibits the downloading when the version of the unit is older. This configuration prohibits generation of a setting error even if the parameter setting device for setting the parameters is in an old version and the unit of the actual machine is in a new version to allow the parameters to be set up properly, so that it can meet the case where the version of the unit of the actual machine is inconsistent with the version of the parameter setting device, thereby allowing user to set the parameters without being conscious of consistency or inconsistency between the both.

The parameter setting device may be so constituted that the downloading means executes the downloading of the parameter to make the unit operate corresponding to the version of the machine type definition file without handling as an error when the version of the unit is newer.

The parameter setting device may be so constituted that wherein the plurality of machine type definition file includes different versions of machine type definition files and the parameter is set with the machine type definition file corresponding to a newest machine type in the machine type definition files, and wherein the means for comparing compares a version of the machine type definition file with the version of the unit to be set up, prohibits the downloading when the version of the unit is older, retrieves the machine type definition file suitable for the unit from the plurality of machine type definition file, sets up the parameter based on the retrieved machine type definition file and executes the downloading of the parameter.

To achieve the above object, according to another aspect of the invention, there is provided a parameter setting device that has a plurality of machine type information definition file corresponding to different versions of each of units constituting a programmable controller so as to set up a parameter to each of the units based on one of the plurality of machine type definition files, comprising: a means for acquiring information about the machine type of the unit constituting the programmable controller by online-connecting to the programmable controller; a means for specifying a corresponding machine type definition file from the plurality of machine type definition file based on the acquired machine type of the unit; a means for displaying a parameter setting screen about the unit based on the specified corresponding machine type definition file; and a downloading means for executing a downloading of the parameter set with the parameter setting screen to the programmable controller including the unit. As a consequence, such a structure allows the parameter setting device to meet a case where the version of the unit of the actual machine is not consistent with the version of the parameter setting device for setting the parameter so that user can set the parameter without being conscious of the consistency or inconsistency between the both.

The parameter setting device may be designed to set up the parameter to the unit having a upper compatible version based on the machine type definition file; wherein the plurality of machine type definition file includes different versions and the version of the corresponding machine type definition file is "older" than the version of the unit.

The parameter setting device is also designed to set up the parameter to the unit storing its machine type definition file based on the plurality of machine type definition file; a storage means for storing the plurality of machine type definition file corresponding to different versions of the unit; a means for determining whether or not the version of the machine type definition file corresponding to the unit for setting parameter is stored in the storage means; a means for uploading the machine type definition file stored in the unit when the result of the means for determination shows not stored; and a means for displaying a parameter setting screen for the unit based on the machine type definition file acquired by the means for uploading.

To achieve the above object, according to still another aspect of the invention, there is provided a parameter setting device for setting a parameter to a unit based on a machine type definition file that defines the parameter for each type and each version of units constituting a programmable controller, comprising: a means for displaying a parameter setting screen based on the machine type definition file of a predetermined version of the unit when editing the parameter to be set up in the unit; a means for executing a downloading of the parameter set with the parameter setting screen to the programmable controller which includes the unit; a means for controlling to compare the version of the unit used when the parameter is edited with the version of the unit at the downloading, to execute the downloading when the version of the unit used when the parameter is edited and the version of the unit are same or the version of the unit is newer and to prohibit the downloading when the version of the unit is older.

The machine type information definition file may be possessed by the parameter setting device or stored in another server, outside storage device, database or the like. The requirement is that a corresponding machine type information definition file needs to be, accessed and acquired.

As a consequence, the present invention allows user to set the parameters without being conscious of consistency or inconsistency between the version of the unit of the actual machine and a version prepared on the parameter setting device, so that user can set the parameter without an error even if the version of the parameter setting device for setting the parameter is old while the version of the unit of the actual machine is new. That is, because the parameter setting device displays the parameter input screen based on the machine type information definition file of a desired version, user can input the parameter according to that parameter input screen. When downloading to the actual machine, the parameter setting device determines whether or not a created parameter has any problem in setting to the actual machine and if it is determined that there is no problem (that the parameter is consistent with the version of the actual machine or the version of the actual machine is newer), only the parameter of a version which allows an action is downloaded and if there is any problem, the downloading is canceled. Because these determination and execution/stop of the downloading are automatically carried out, execution of the downloading means that the parameter can be set up thereby eliminating the necessity for user to be conscious of the version.

The predetermined version of the unit used when displaying the parameter screen can be an updated version. Of course, it may be other version. Usually, user prepares a parameter setting device or the like which meets the function which he/she needs. Therefore, by setting the parameters corresponding to the updated version, he/she can set the parameters for the unit which he/she requires. If the downloading of such parameters succeeds, this warrants that the version of the unit meets the updated version of the parameter setting device which user needs and at the same time, the unit of the actual machine operates as a unit for the updated version.

It is preferable to provide with a function for recording an execution of downloading if the downloading is carried out when the version of the unit of the actual machine is newer. Although according to the present invention, if a parameter of some version is operable on the unit, the parameter of that version is downloaded to the unit, the version of the programming tool side and the version of the actual machine side are not always consistent. Then, if the downloading of the parameters is executed when the versions are not consistent, by recording this fact (meaning that the processing has been performed), user can recognize that the versions are inconsistent by reading this record. Then, if there is no problem in the condition in which the versions are not consistent, user may leave it without doing anything. If required, he/she acquires a machine type information definition file of the updated or necessary version for the unit so as to keep the machine type information definition file available and sets up the parameters again based on that machine type information definition file. As a consequence, the parameter setting which allows the unit to achieve an action required by user can be executed.

It is preferable to provided with a function for, before transmitting parameters created for each of the plural units constituting the programmable controller to the programmable controller in batch, checking the type and version of each unit and if the type and version are not consistent, canceling the transmission of the parameter of the unit and proceeding to parameter transmission processing for a next unit. As a consequence, if the downloading is executed in batch, whether or not the downloading for each unit is possible can be determined.

On the other hand, the parameter setting device may be so constructed to comprise: a means for acquiring a type and a version of a unit constituting a programmable controller by connecting to the programmable controller online; a means for specifying a machine type definition file corresponding to the unit based on the type and the version of the unit acquired by the means for acquiring; and a means for displaying a parameter setting screen based on the specified machine type definition file corresponding to the unit.

As a consequence, user can set up the parameters by acquiring a machine type information definition file suitable for the configuration of the actual machine. Thus, user can set the parameters without being conscious of consistency or inconsistency between the version of the unit of the actual machine and the version of the programming tool side.

The machine type definition file corresponding to the unit is of the same type as the unit which version is older than the version of the unit. Alternatively, the version of the machine type information definition file is permitted to adopt only a consistent one.

The means for displaying the parameter setting screen may display a default value stored in the machine type definition file for displaying the parameter setting screen. As a result, user can know the suitability of the parameters to some extent thereby facilitating the setting processing. Of course, user can set up an arbitrary value from the beginning without using the default value.

The parameter setting device may further comprise: a means for acquiring a parameter set in the unit constituting the programmable controller by connecting to the programmable controller online, wherein the means for displaying the parameter setting screen checks the type and the version in the acquired parameter for displaying the parameter setting screen and prohibits to display as an error when the type in the acquired parameter is not same to the type in the machine type definition file.

Further, the parameter setting device may further comprise: a means for acquiring a parameter set in the unit constituting the programmable controller by connecting to the programmable controller online; wherein the means for displaying the parameter setting screen checks the type and the version in the acquired parameter for displaying the parameter setting screen and for displaying the parameter setting screen without changing the version in the parameter setting device when the type in the acquired parameter is same to the type in the machine type definition file and the version in the acquired parameter is newer.

Still further, the parameter setting device may further comprise: a means for acquiring a parameter set in the unit constituting the programmable controller by connecting to the programmable controller online; wherein the means for displaying the parameter setting screen checks the type and the version in the acquired parameter for displaying the parameter setting screen and displays the parameter setting screen based on the machine type definition file corresponding to the version of the unit when the type in the acquired parameter is same to the type in the machine type definition file are same and the version in the acquired parameter is older.

Still further, the parameter setting device may further comprise: a means for acquiring a parameter set in the unit constituting the programmable controller by connecting to the programmable controller online; wherein the means for displaying the parameter setting screen checks the type and the version in the acquired parameter, displays an inquiry screen inquiring whether or not adapting the version in the machine type definition file to the version in the acquired parameter when the type in the acquired parameter is same to the type in the machine type definition file and the version in the acquired parameter is older, and displays the parameter setting screen based on the machine type definition file which version corresponds to the version of the unit under a condition of a user approval for the inquiry.

Yet still further, the parameter setting device may further comprise: a function that is connected to the programmable controller online so as to acquire a parameter set in the unit of the actual machine constituting the programmable controller wherein the device for displaying the parameter setting screen sets the acquired parameter to the unit of the actual machine. If the parameter is already set in the unit connected online, it is more preferable to acquire and correct that parameter. Of course, if any parameter is not yet set in a unit of the actual machine, the parameter can be set easily if the aforementioned default value is used.

If the parameter setting device does not have (or has no information necessary for access) any machine type information definition file of a version corresponding to a given unit as a result of executing acquisition and checking of the type and version of the actual machine through online connection, the parameter setting screen cannot be displayed. However, a parameter setting screen suitable for that unit can be displayed by acquiring a corresponding machine type information definition file. That is, the present invention converts the parameter setting device to a parameter setting device capable of meeting an updated unit only by adding or installing the machine type information definition file without changing the parameter setting device itself. As a method for acquiring a novel or newest machine type information definition file, for example, there is available a method of acquiring the file by accessing a site of manufacturer of that unit and downloading it or a method of storing the machine type information definition file of the unit in that unit itself and then acquiring that machine type information definition file stored in the unit when the parameter setting device is connected to the unit online.

The present invention allows user to set the parameters without being conscious of consistency or inconsistency between the version of the unit of the actual machine and the version of the programming tool for setting the unit even if both the versions are not consistent, so that he/she can set the parameters without an error even if the version of the parameter setting machine for setting the parameter is in old version while the version of the unit of the actual machine is in new version.

BRIEF DESCRIPTION OF THE DRAWINGS

FIG. 3 is a diagram showing an example of data structure of the unit information storage;

FIG. 10 is a diagram showing an example of a parameter input (edit) screen;

FIG. 14 is a diagram showing an example of the parameter input (edit) screen.

DETAILED DESCRIPTION OF THE PREFERRED EMBODIMENTS

Figure 1:
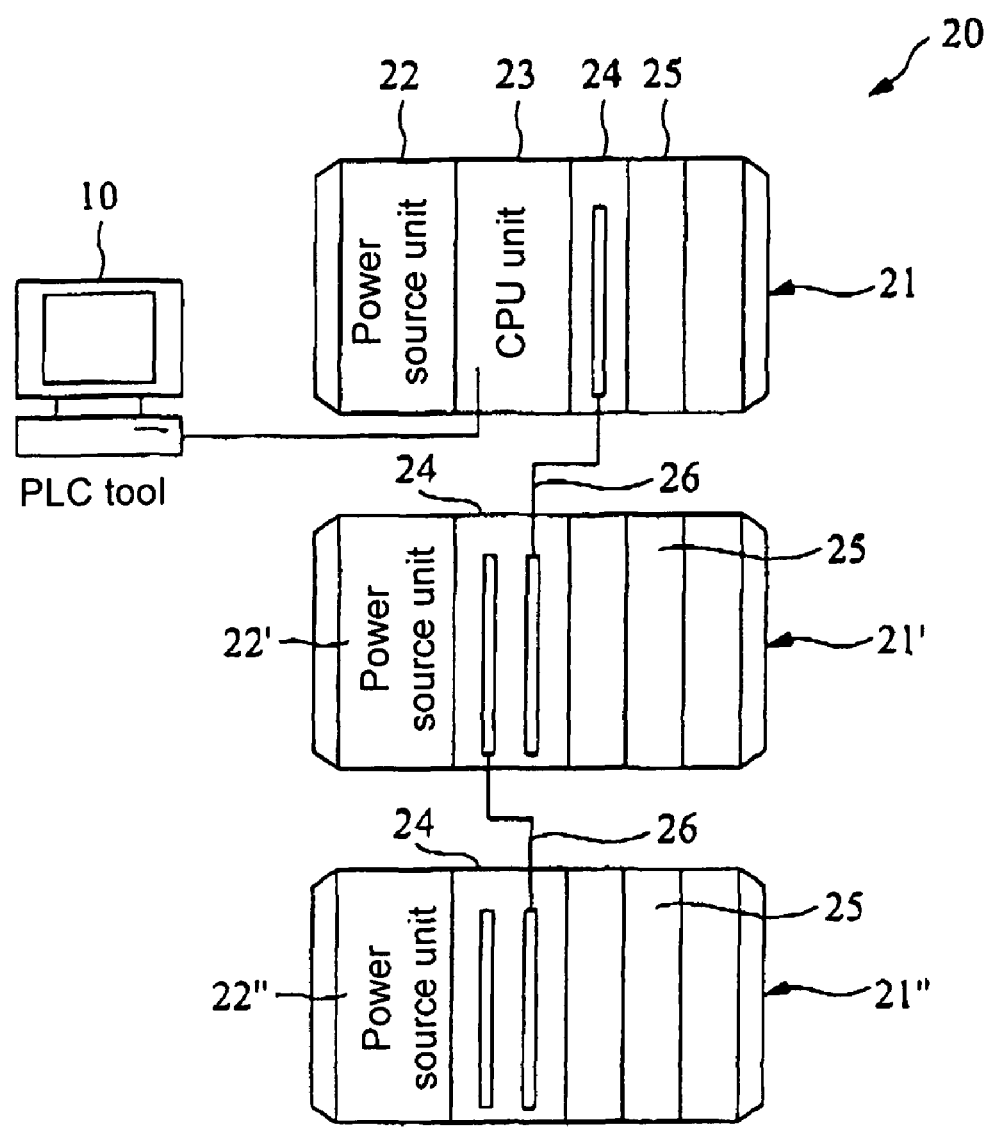
FIG. 1 is a diagram showing an example of an actual machine image of the PLC system.

FIG. 1 shows an example of an actual machine image of a PLC tool unit 10 acting as a parameter setting unit and a PLC system 20 which is a setting object of this PLC tool unit 10. This PLC system 20 is comprised of plural racks 21, 21', 21". The respective racks 21, 21', 21" are equipped with power source units 22, 22', 22" and the units which constitute the same rack are supplied with power from the power source units connected to those racks. One of the plural racks is a CPU rack 21 equipped with the CPU unit 23 and other racks 21', 21" are not equipped with a CPU unit and controlled by the CPU unit 23 of the CPU rack 21 (for example, IO refresh). A repeater unit 24 for connecting those racks 21, 21', 21" such that they are capable of communicating and a variety of units 25 (IO unit, master unit, communication unit, high function unit (position control unit, motion controller unit and the like) and the like) necessary for performing a desired control of the PLC system 20 are connected to the respective racks 21, 21', 21". The power source units 22, 22', 22" installed on the respective racks 21, 21', 21" may be of the same type or of different types. Further, the repeater units 24 are connected with a predetermined wiring cable 26. Although the same Figure shows a case where the PLC system 20 is constructed by connecting the three racks, the quantity of the racks which constitute the PLC system 20 is arbitrary and it may be constructed of a single rack (only CPU rack 21).

The PLC system 20 has two structure types for combining the respective units. One of them is a type of connecting with a base unit and another is a type of connecting through a connector. The base unit connection type connects the respective units electrically and mechanically by attaching desired units to slots in parallel, the slots being provided on a base unit on the flat face. This is called building block type in other words. This base unit is constructed in the form of PLC bus for data communication between the respective units of the PLC, that is, so that power lines for supplying power to the respective units are placed internally. Each unit receives supplied power through the power line and can execute data communication through the PLC bus of the base unit. In another connector connecting type, connectors are disposed on both sides of each unit and the respective units are connected electrically and mechanically with this connector. Connecting these connectors provides a structure in which the PLC bus (connected to a connector) wired in each unit becomes conductive. In the meantime, the connector connecting type unit has DIN mounting rail structure on its back and respective units are fixed in parallel through the DIN rail. Although the present invention is applicable to any type, the type of connecting with the base unit will be described below.

The PLC tool unit 10 has a PLC system building assistant function for obtaining an appropriate unit configuration in order to build the PLC system 20 having an arbitrary structure by combining various units, set up parameters to a unit which constitutes the PLC or design a PLC system configuration meeting a control object. Such a tool unit is sometimes called PLC system building assistant unit or configurator. As evident from FIG. 1, the PLC tool unit 10 is constructed by installing a predetermined application program (tool) into the personal computer. This PLC tool unit 10 is a parameter setting unit for setting parameters to the unit if speaking from the relation with the present invention. Of course, it has a programming tool and the like for creating a user program to be executed by the CPU unit and downloading it.

Figure 2:
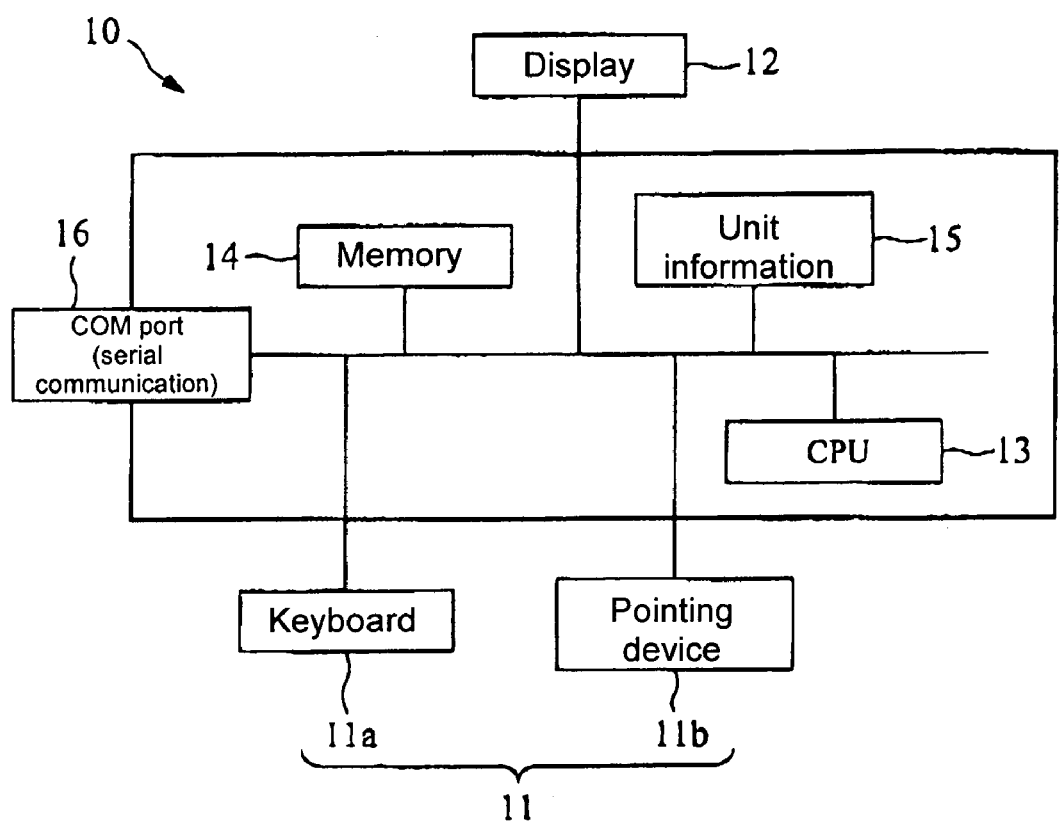
FIG. 2 is a diagram showing an example of the structure of PLC tool unit.

FIG. 2 shows the internal structure of the PLC tool unit 10. As shown in FIG. 2, this PLC tool unit 10 has a keyboard 1a, an input portion 11 such as a pointing device 11b and a display portion 12 such as a display as an outside device (man-machine interface). Further, it includes CPU (control unit) 13 which executes a variety of arithmetic operations and a variety of processing of creating unit configuration information and the like, a memory (RAM) 14 used appropriately as a work memory when the CPU 13 executes a variety of processing such as arithmetic operation, a unit information storage 15 which stores information about the unit and COM port 16 used for downloading information for setting up various units which constitute the PLC system 20 created by the CPU 13 to the PLC system 20. The CPU 13 displays various input screens on the display portion 12 and user operates the input portion 11 to receive an input of necessary information to determine unit configuration information.

The unit information storage 15 of the PLC tool unit 10 records information about usable units, for example, lists about unit types, unit models and the like and function of each unit and parameter of a setting object. If speaking under a relation with the present invention, that information includes information which relates version types (main version, minor version) existing for each unit specified by each model with parameters which can be set up for each version.

For example, FIG. 3 provides a table configuration which relates "type", "version", "updated version" and "machine type information definition file name". This "type" refers to a number or machine number which manufacturer uses to distinguish a product type attached to that unit. Usually, the type is a combination of alphabets and numerals, therefore, user cannot understand content intuitively only by seeing the type. Thus, it is permissible to store character string such as a specific name, commonly-used name together as information which user can understand easily. The "version" is a version existing for a unit specified by the type and for example, the version changes each time when it is improved and the "version" is comprised of main version and minor version. Therefore, the table stored in the unit information storage 15 includes different versions of the same type. The version is expressed with numerals and a higher number indicates more updated version. The "updated version" is a unit type subjected to the updated improvement and whether or not it is the updated version is recorded. That is, in case of the updated version, "1" is registered and in case of older version before the updated improvement is performed, "0" is registered. The "machine type information definition file name" is a file name of a file containing information such as parameters which should be set up corresponding to a corresponding version of the type. By opening this machine type information definition file name, detailed information about a corresponding version of the type (parameter item setting range and the like if speaking under the relation with the present invention) can be obtained. In the meantime, the machine type information definition file holds information for checking consistency in system, information for display and information for parameter setting. The parameter setting has a different unit for each version. However, so-called upper compatibility is ensured. The upper compatibility means that updated version unit is compatible in the same type unit about function setting and the like possessed by older version unit. That is, basically, it means that all parameter items which can be set up by older version unit can be always set up in the machine type information definition file of the updated version unit.

That is, as described above, sometimes a certain type unit of units which constitute the PLC (PLC system) includes one or plural versions (unit version(s)) and the parameter setting items may differ because of a difference of the unit version. In the PLC tool unit 10, it is ideal to create machine type information definition files for all combinations of these unit types and unit versions and install it in system. If the "machine type" comprised of the type and version is used, it is ideal to create the machine type information definition file of each machine type in the PLC tool unit 10 and install it in the system. Installing mentioned here refers to registering information (table shown in FIG. 3) necessary for retrieving the machine type information definition file into the unit information storage 15 when the system includes database (unit information storage 15). As a result, the PLC tool unit 10 can retrieve the machine type information definition file from unit information (the above-described table) stored in the unit information storage 15 and specify corresponding machine type information definition file. In the meantime, actual machine type information definition file may be stored in a memory device in the PLC tool unit 10 or in an outside storage device or a server or other arbitrary place connected through network.

Figure 4:
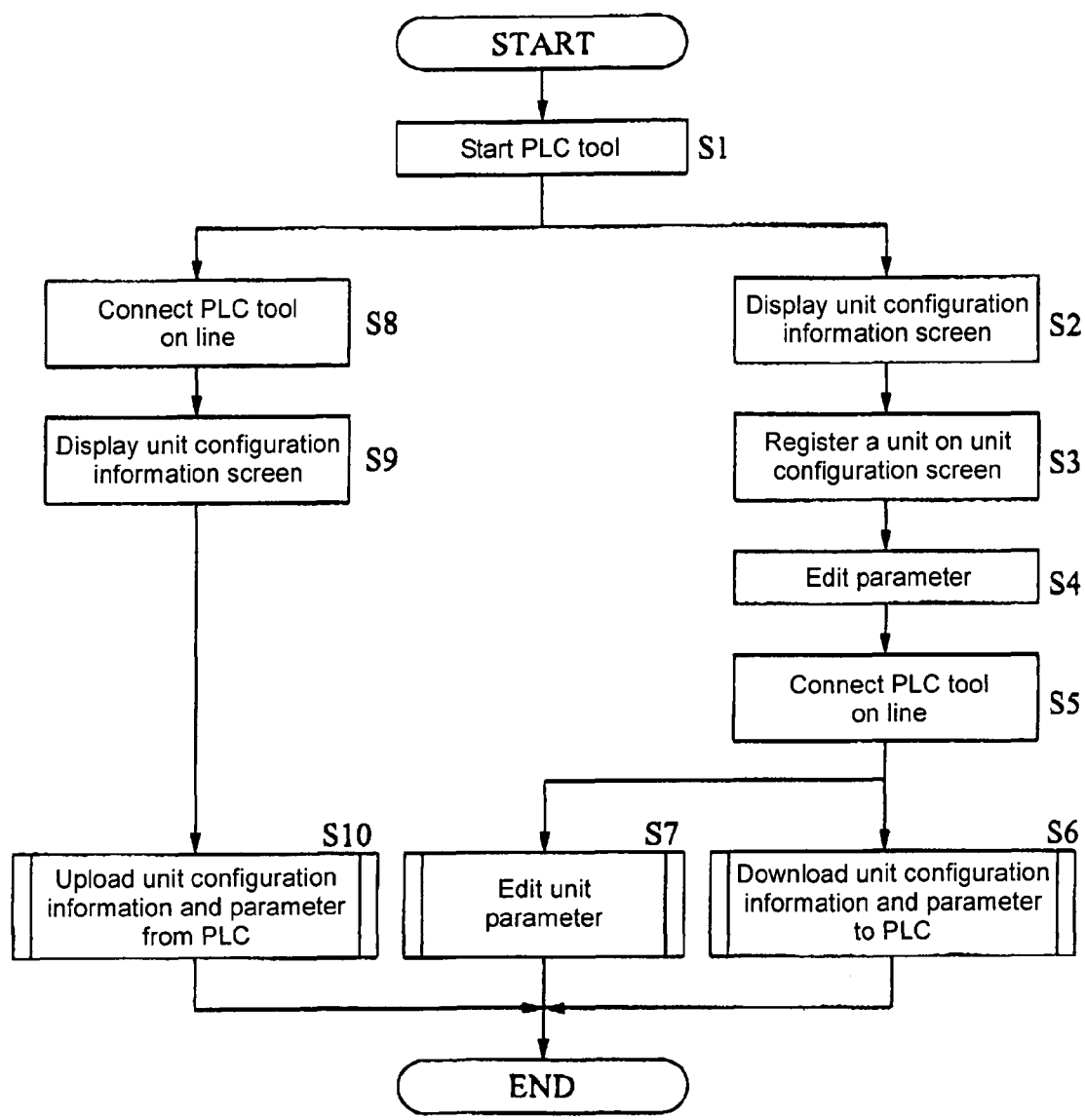
FIG. 4 is a flow chart showing the function of the CPU.
Figure 5:
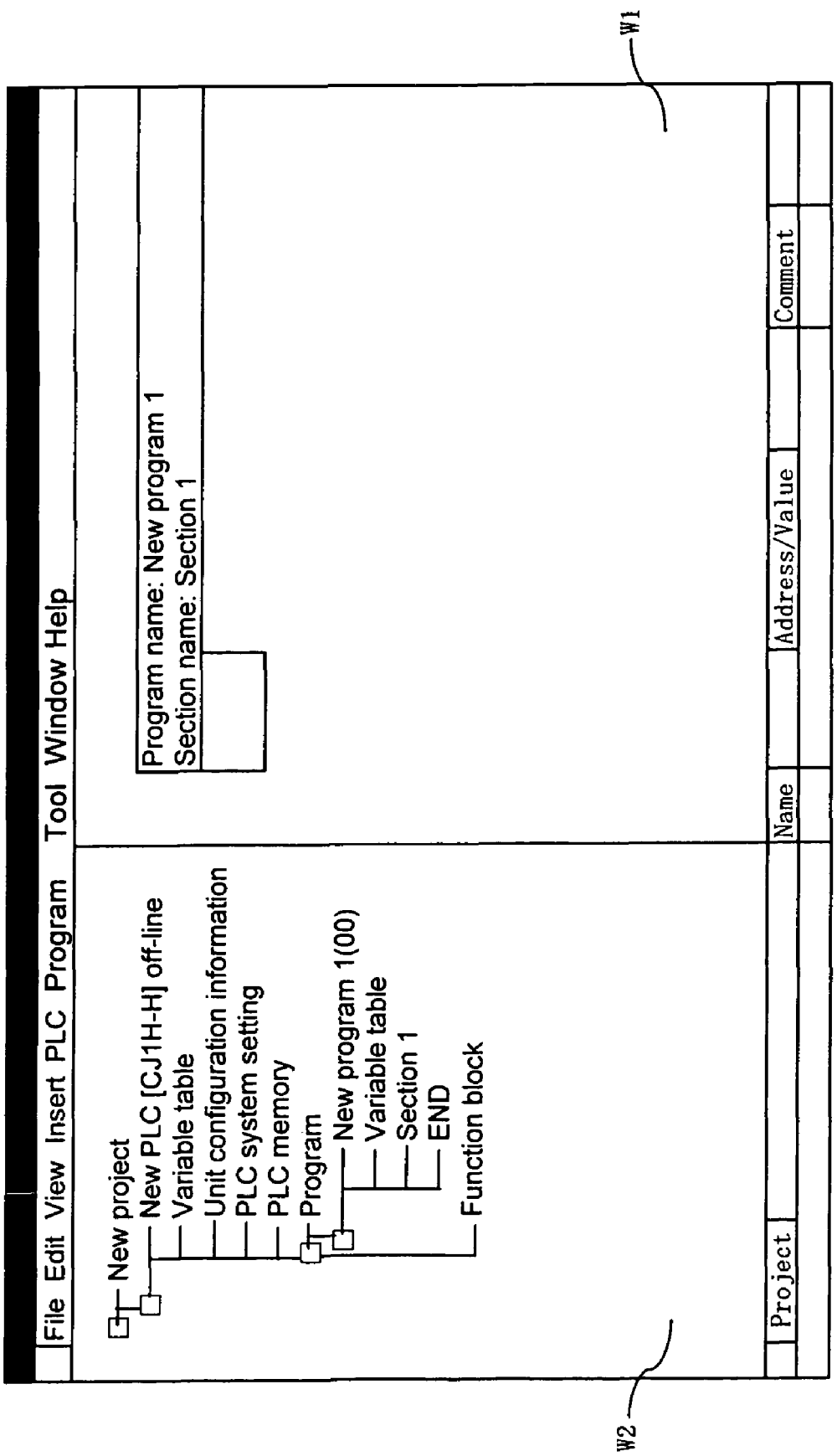
FIG. 5 is a diagram showing an example of a display screen of the tool.

FIG. 4 is a flow chart showing basic processing function which the CPU 13 of the PLC tool unit 10 executes. First, the PLC tool unit 10 is started (S1). The PLC tool 10 of this embodiment is incorporated in the CPU unit 23 or the like together with a programming tool for creating download user program. A basic screen shown in FIG. 5 is displayed. As shown in FIG. 5, the right window W1 of the basic screen shows a screen for creating a user program (ladder diagram) and its left window shows a project selection screen W2 of project information about the PLC structure to be registered.

When a parameter is set in each unit constituting the PLC in the PLC tool unit 10, it is necessary to specify which unit configuration the PLC 20 adopts. As a method for obtaining information of a certain unit configuration, if an actual PLC is already established, it is permissible to connect the PLC tool unit 10 to that PLC online and acquire the unit configuration information constituting that PLC to specify that unit. If no actual PLC exists, the unit configuration can be created offline using the function of creating the unit configuration information of the PLC tool unit 10. In any case, finally set parameter is set up in each unit constituting a target PLC.

Figure 6:
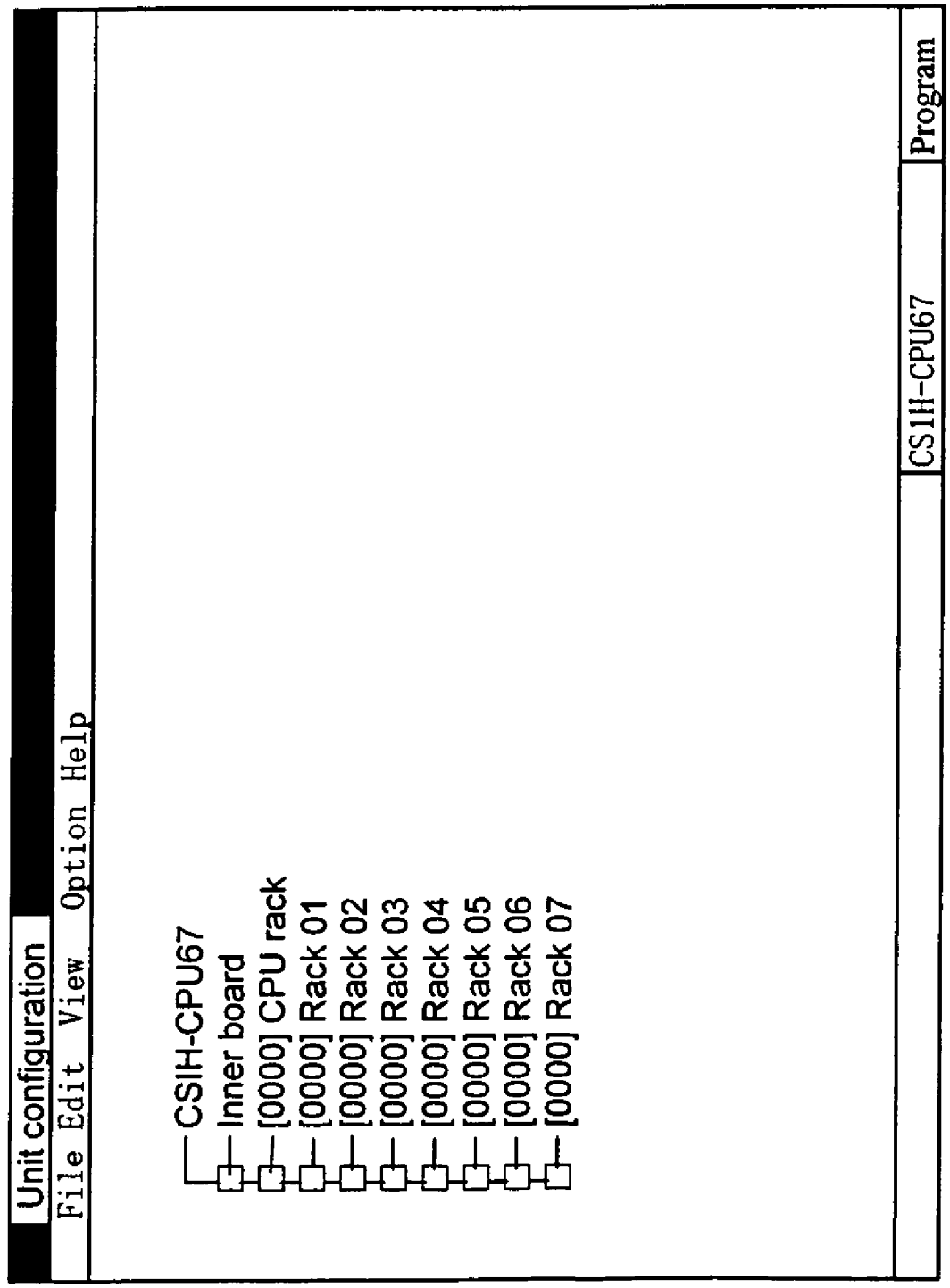
FIG. 6 is a diagram showing an example of a unit structure screen.

The setting offline will be described for convenience for explanation. First, user selects "unit configuration information" displayed in the form of a tree in the project selection screen W2 by double-click or the like of a pointing device 11b in the display screen shown in FIG. 5. When the PLC tool unit 10 recognizes that the "unit configuration information" is clicked, it displays the unit configuration information screen shown in FIG. 6 (S2). Because this embodiment is capable of meeting a PLC system in which eight racks at maximum including the CPU rack are connected, its initial screen displays "CPU rack", "rack 01", "rack 02", "rack 03" . . . "rack 07" in the form of a tree as shown in the same Figure so that the unit configuration of each rack is indicated in its closed condition without being displayed. If speaking about correspondence with FIG. 1, "CPU rack" corresponds to 21, "rack 01" corresponds to 21' and "rack 02" corresponds to 21". Although followings of "rack 03" are not indicated in FIG. 1, they are elements to be built.

Actually prior to displaying of this unit configuration information screen (FIG. 6), first, the CPU unit of the CPU rack is registered. That is, the PLC tool unit 10 displays a screen which urges user whether or not the PLC rack configuration should be registered newly in a dialog window screen. Then, the PLC tool unit 10 receives an input for registration by user's operation and next, displays a screen for selecting the type of the CPU unit to urge user to input selectively. The PLC tool unit 10 receives an input of type information of the CPU unit by user's operation. For example, if it receives an input indicating that a CPU unit of type "CS1H-CPU67", the PLC tool unit registers the type of a target CPU unit and the initial information of the CPU rack configuration. Registration of this CPU unit allows the PLC tool unit 10 to register the type of a CPU unit corresponding to the CPU unit 23 of the CPU 21 in the PLC system in FIG. 1. The type of this registered CPU unit is displayed on the top stage of the tree indication on the unit configuration information screen of FIG. 6.

Figure 7:
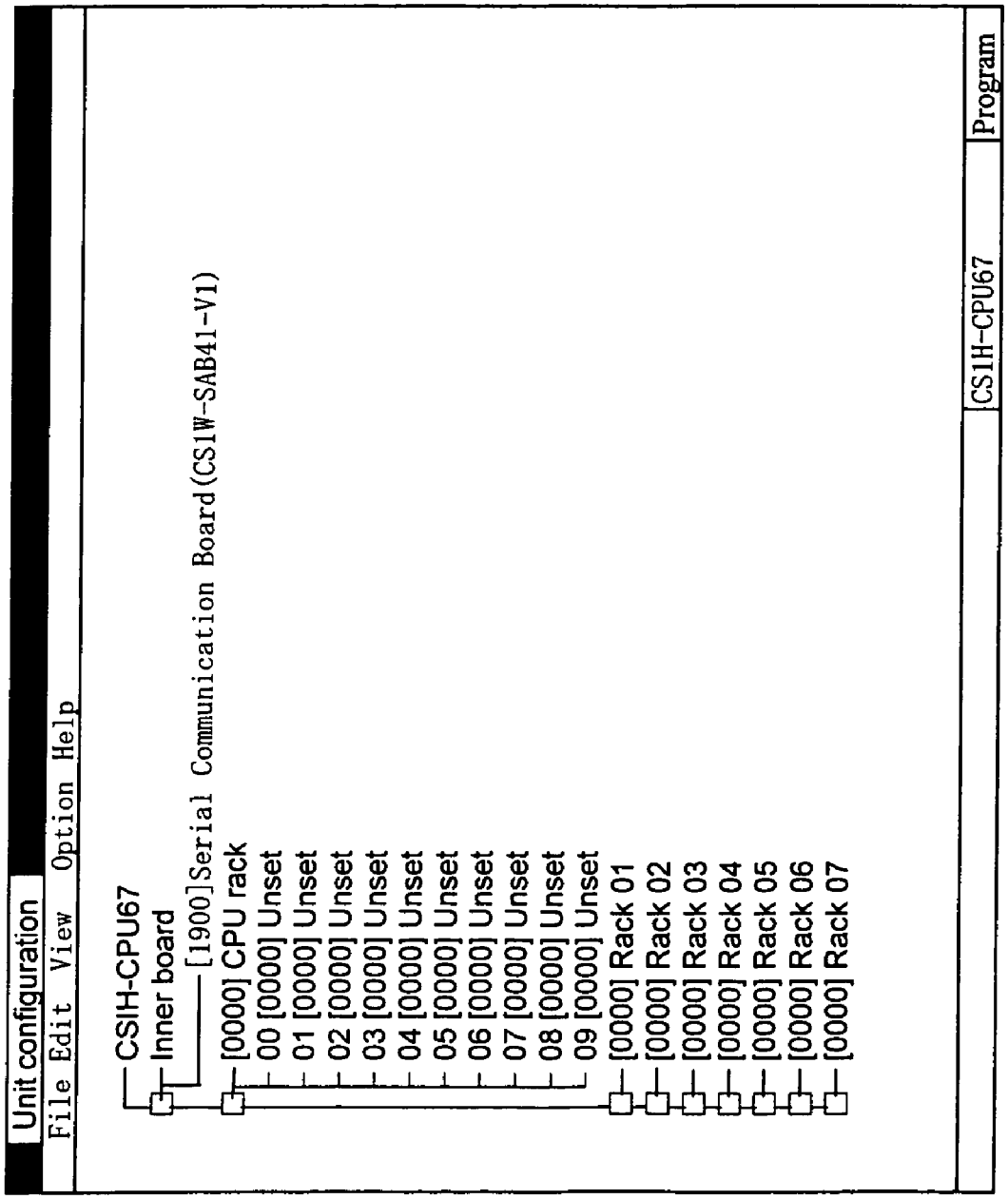
FIG. 7 is a diagram showing an example of the unit structure screen.

Next, the procedure proceeds to step of registering various units to be incorporated in each rack on this unit configuration information screen (S3). That is, if a rack to be set up is closed like the initial screen, the rack is opened appropriately by clicking a "+" button indicated at the head of the tree indication of the rack for use (for setting). FIG. 7 shows a condition in which the CPU rack is opened. As indicated, each rack allows 10 units at maximum to be stored therein (in case of the CPU rack, 10 units except the CPU unit). Because others than the CPU unit of the CPU rack are not registered, "empty slot" is indicated at every place of the tree indication of each unit of the 10 units (any unit to be installed on a slot prepared in the base unit is not set up).

Figure 8:
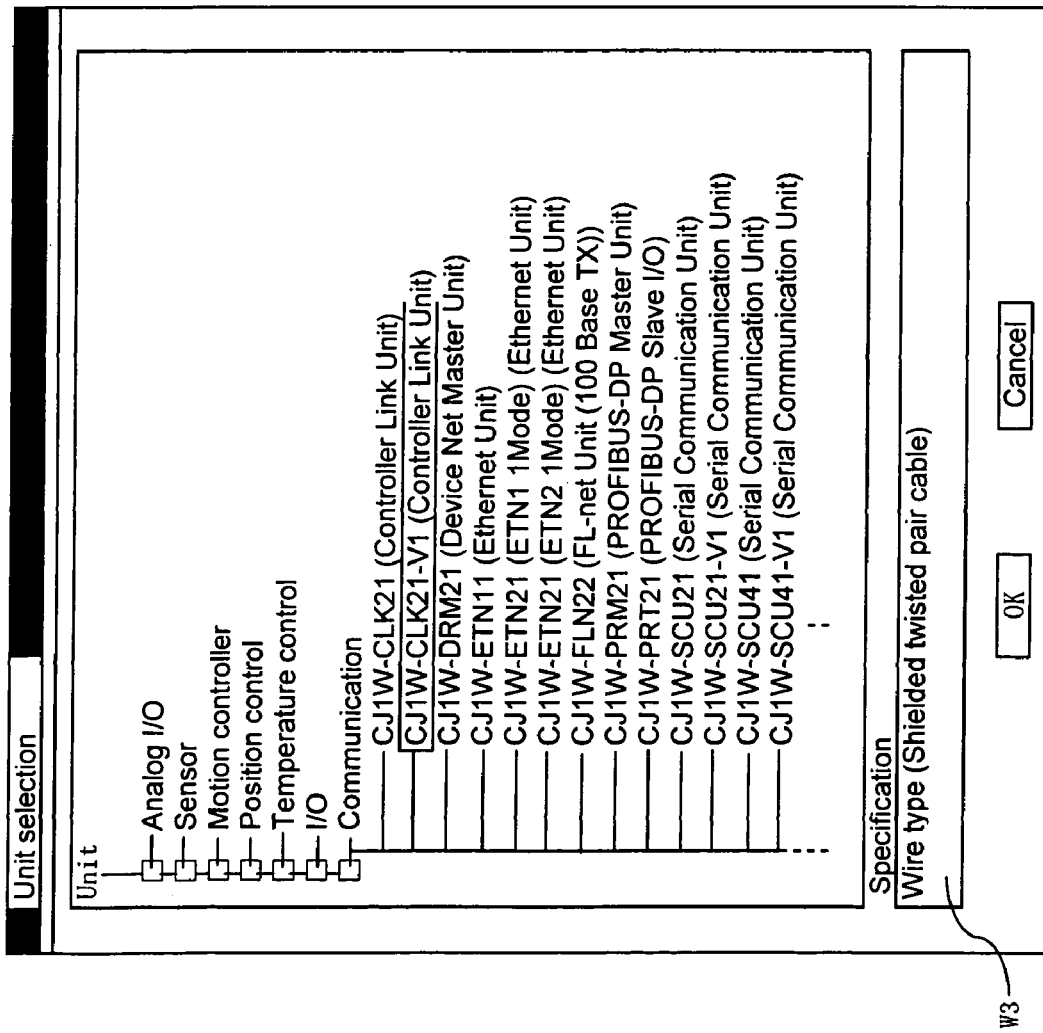
FIG. 8 is a diagram showing an example of the unit structure screen.
Figure 9:
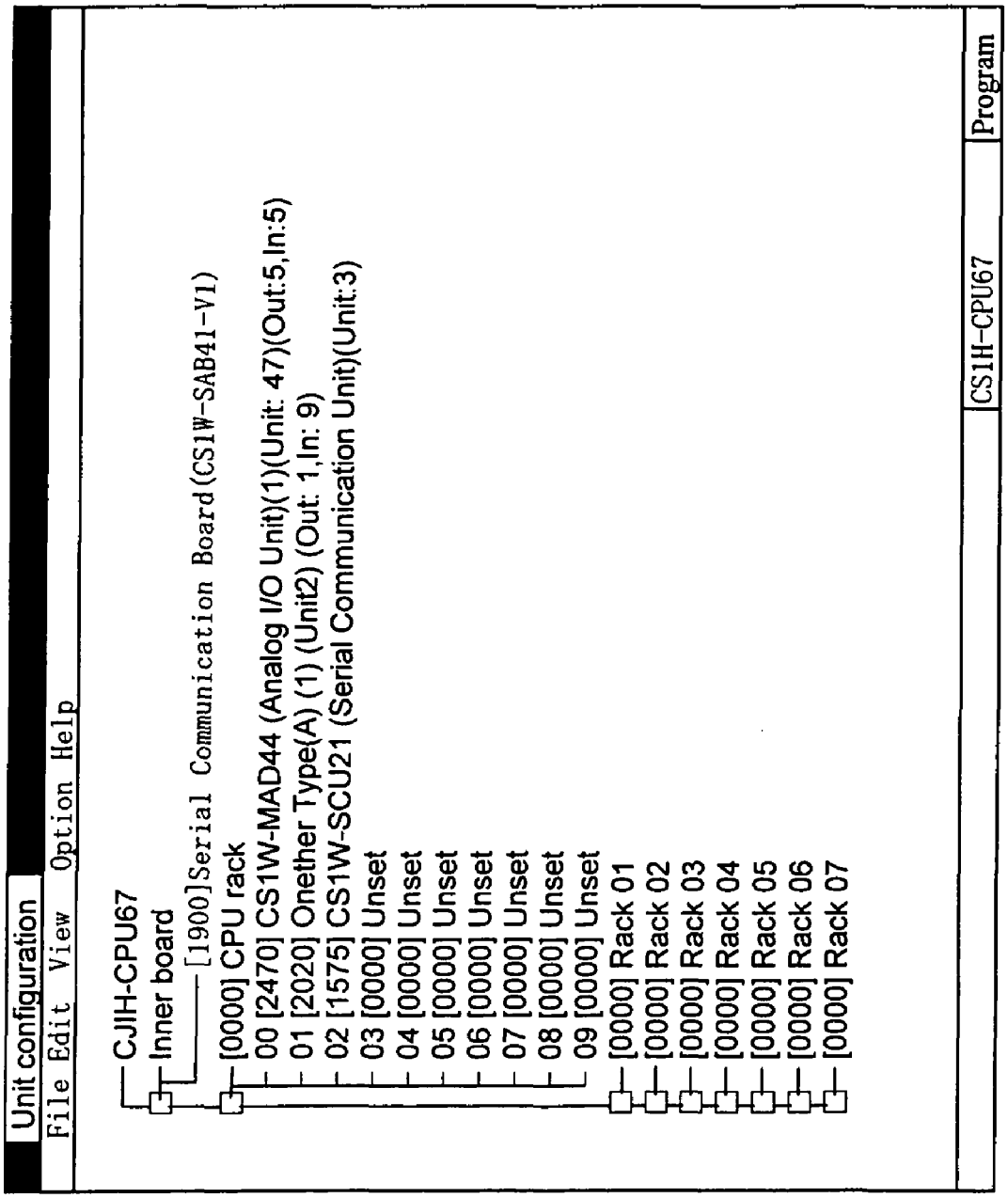
FIG. 9 is a diagram showing an example of the unit structure screen.

Next, actual unit registration processing is carried out. Upon new registration, user selects a column of "empty slot" in the tree indication by operating the pointing device 11b and double-clicks it, so that a unit selection screen as shown in FIG. 8 is displayed in another window. The PLC tool unit 10 displays the unit selection screen by referring to the unit information storage 15. This screen displays target units constituting the PLC for each type in the form of the tree. For example, in FIG. 8, "analog I/O unit", "sensor unit", "motion controller", "position control unit", "temperature adjustment unit", "basic I/O unit", "communication unit" are displayed in the form of the tree. The PLC tool unit 10 displays the type information of the unit with reference to the unit information storage 15 when user clicks the "+" on the tree indication screen with the pointing device 11b. User finds out a unit which he/she wants to use from a unit list using this screen, selects it and registers it. In the example of FIG. 9, the unit type is "communication unit" and its type indicates a condition in which "CJ1W-CLK21-V1" unit is selected. Because the unit selection screen displays the tree structure which is classified depending on unit type, user can select a target unit easily.

If speaking the user's operation in detail, user clicks an indication of a unit for use by operating the input portion 11 like the point device 11b. As a result, the control portion 13 displays the clicked unit type name in highlight condition indicating that it is selected temporarily and reads out information relating to that unit from database about the units (not shown) and displays the read out information in the window W3 of the "specification". Then, if the "OK" button is clicked, that unit selected temporarily is registered at a position specified on the unit configuration information screen of FIG. 7 and information such as type is displayed additionally.

FIG. 9 shows a unit configuration screen after the unit registration operation has been repeated several times. As evident from FIG. 9, if any unit is already registered, that set unit type is displayed and if any unit is not registered, "empty slot" is displayed. When a unit is registered, its type information stored in the unit information storage 15 is read out and displayed. A specific name indicated with parentheses following the type is displayed only if it is registered in the column of the "type" of the unit information storage 15 as described above. Although specific representation is omitted, it is permissible to register only its type name in the unit information storage 15, prepare a table which relates the type name with the specific name and read out necessary information from that table so as to display it. Further the machine type information definition file specified by a machine type information definition file name includes a variety of information such as input/output point number (reflected on memory usage CH) as well as information about parameter setting about that unit. The point number information is displayed based on these information pieces as shown in FIG. 9. Of course, such display is not indispensable.

If a unit registered on the unit configuration information screen of FIG. 9 is replaced with another unit, the corresponding unit on the unit configuration information screen of FIG. 8 may be selected by clicking and deleted and the CPU 13 is allowed to make new registration with the "empty slot" condition. That unit may be changed with another unit by changing processing. Because this embodiment automatically sets up a usage area for memory (channel) (a numeral indicated with the parentheses described in front of type name), it is permitted to be changed with only a unit capable of possessing that information, that is, the same kind of the unit. Because whether or not it is a unit which can be changed can be found by referring to the machine type information definition file or the like specified with the "machine type information definition file name" stored in the unit information storage 15, only corresponding units are extracted and displayed. In the meantime, unless the memory is automatically set up, it is permissible to select such a specification which allows it to be changed with every unit.

When all the units are registered, parameter editing processing is carried out (S4). That is, user selects a unit for editing processing of parameters from units displayed on the unit configuration information screen shown in FIG. 9. This selection processing is carried out by user's clicking a unit to be set up by operating the pointing device 11b like the above-described various selection processings. Then, the PLC tool unit 10 recognizes the selected unit and displays a parameter input screen corresponding to that unit as shown in FIG. 10.

This parameter input screen displays a type corresponding to updated version of the selected unit type. The machine type information definition file of the updated version can be obtained when the CPU 13 accesses the unit information storage 15, retrieves a unit type having "1" in its updated version column of the selected unit types to acquire a corresponding machine type information definition file and obtains a corresponding file through access to it.

As shown in FIG. 10, the parameter input screen comprises "item names" of parameters to be set up, "setting values" corresponding to each item and "unit". User inputs into and sets up "setting value" columns. A parameter item name, range of value of each item, data size and transmission destination address, which are displayed on this parameter input screen (edit screen), are defined on a definition file. The machine type information definition file holds parameter suitable for that unit as default setting information and when it is called first, displays that parameter value as the default setting value on the setting value column. User corrects a setting value if he/she wants to and if the edit of the parameters to that unit ends, clicks the "OK" button. As a consequence, the content of the setting value when the "OK" button is clicked is registered as a parameter of that unit.

When the button for "returning to default setting value (E)" is clicked, the CPU 13 reads out default setting information stored in a corresponding machine type information definition file and returns the setting values to all the parameters to the default setting in the initial condition. In this way, user inputs necessary information (parameters) to a related parameter input screen and sets a parameter for each unit.

Figure 11:
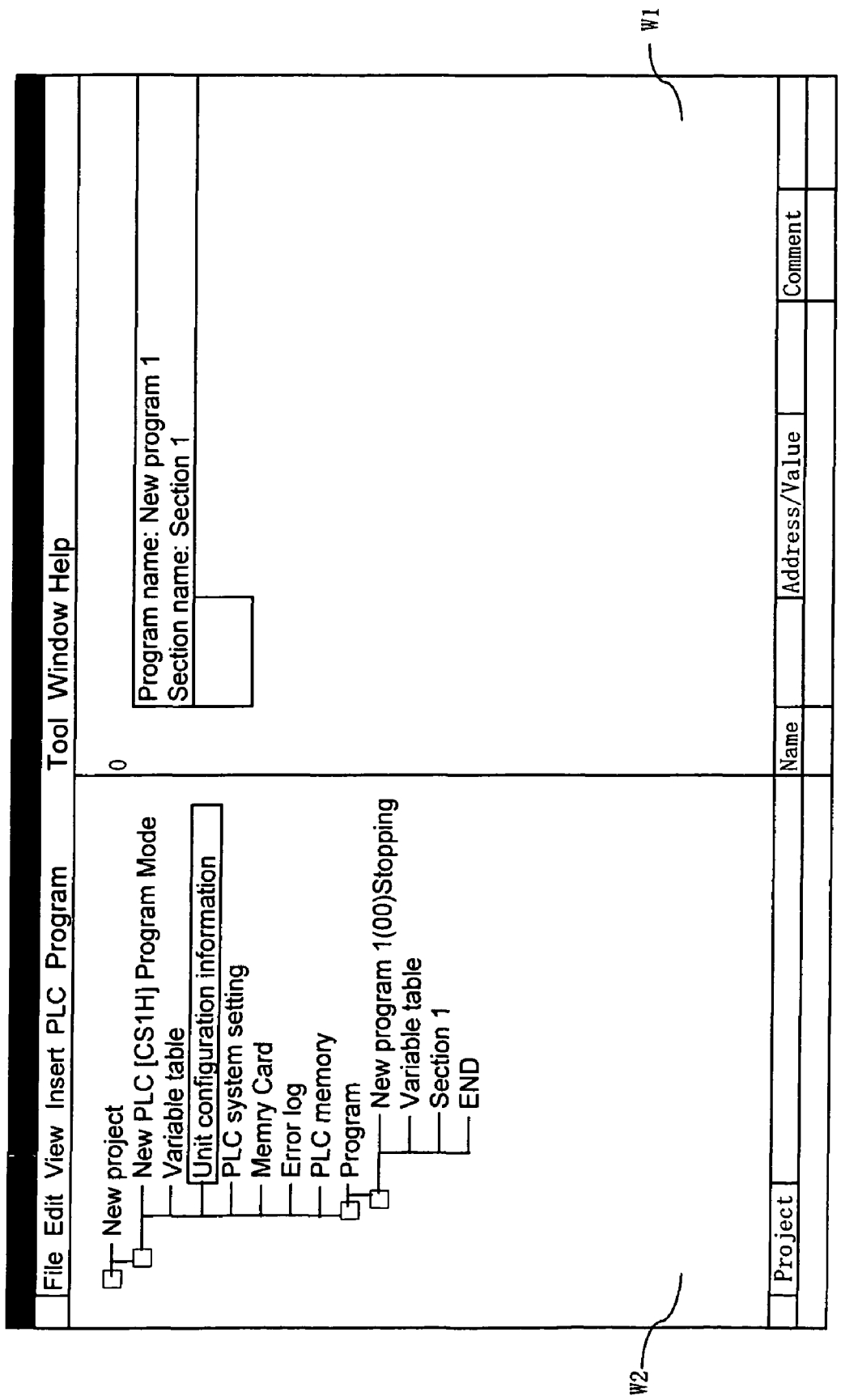
FIG. 11 is a diagram showing an example of the display screen of the tool.

After the parameter edit processing is finished, next, the PLC tool unit 10 is connected to the PLC system 20 to be set up online (S5). Whether or not the edit processing is finished is determined by user and in this online connection processing, user actually brings the PLC tool unit 10 into communicable state with the PLC system 20 as shown in FIG. 1. This processing is the same as the conventional art. Then, after the online connection, the display portion 12 is switched to a screen as shown in FIG. 11. If comparing FIG. 5 with FIG. 11, although FIG. 11 has no indication about "offline" as well as the CPU unit type on the project selection screen W2 and the "x" mark in FIG. 5 indicates that the PLC system is not connected (offline), such "x" mark is eliminated when the online connection is established.

Such online connection with the PLC system enables the parameters of all the units as well as created unit configuration information to be transmitted (downloaded) to the PLC (S6). Although as described above, the parameter setting offline is performed assuming that the version of a unit to be set up is updated version, the actual unit is not always the updated version. Conversely, sometimes, the information of the machine type information definition file prepared for the PLC tool unit 10 is so old that it does not suit to the updated version or the version of the updated machine type information definition file prepared for the PLC tool unit 10 may be older than the actual PLC version. Then, whether or not the parameter can be transmitted based on a following rule is determined for each unit, depending on the states of the actual machine and versions of the machine type information definition file on the tool side.

(1) If the version set in the PLC tool unit 10 is older than the actual version (unit version) on the PLC side, created parameter is transmitted to the PLC. In this case, each unit of the PLC is actuated as a unit under older version using the upper compatibility.

(2) Because there is no problem if the version set by the PLC tool unit 10 coincides with the actual version on the PLC side, the created parameter is transmitted to the PLC.

(3) If the version set by the PLC tool unit 10 is newer than the actual version on the PLC side, no created parameter is transmitted but user is notified through a message. However in this case, if user receives this message, usually, he/she prepares a parameter input screen (parameter edit screen) based on machine type information definition file suiting to the unit version, sets parameters again using it and transmit to the PLC. Meanwhile, the "version set by the PLC tool unit 10" mentioned in (1)-(3) includes at least one of meaning of the version of updated machine type information definition file possessed by the PLC tool unit 10 and version or machine type of the PLC tool unit 10. Further, "version on the PLC side" includes at least a meaning of the version of a unit which constitutes the PLC and the machine type of a unit which constitutes the PLC.

If the version on the PLC tool unit 10 is older than the version of the PLC side, a following use case can be estimated. User builds up a system to design configuration information on the PLC tool unit 10 also and starts the operation of the system. When the PLC unit is in trouble in halfway and that unit is replaced, sometimes it may be made evident that the unit version has been changed (updating version). In such a case, often there are only products whose version is updated although user has no problem in its old version upon actual usage, so that the updated version functions are not necessary. In such a case, user needs to transmit the previously set parameter setting information of the old version to the PLC because the new unit ensures the upper compatibility and has no problem if operations guaranteed by the old version parameter setting information can be executed. Conversely, if the PLC tool unit 10 is changed to the new version corresponding to such a replaced unit, necessity of verifying the quality again is generated.

On the other hand, if the version of the PLC tool unit 10 is newer than the version of the PLC, transmission of information such as parameters by batch transmission processing is prohibited because existing PLC unit does not always guarantee down compatibility. That is, this is because if a parameter created by new version is transmitted, the older version comes to acquire unknown parameters which cannot be met so that the old version unit may malfunction unless the down compatibility is guaranteed. That is, this is because even if no malfunction occurs, the old version unit is not actuated with the parameters which cannot be met, so that an operation expected by user may not be guaranteed by the old version unit.

Figure 12:
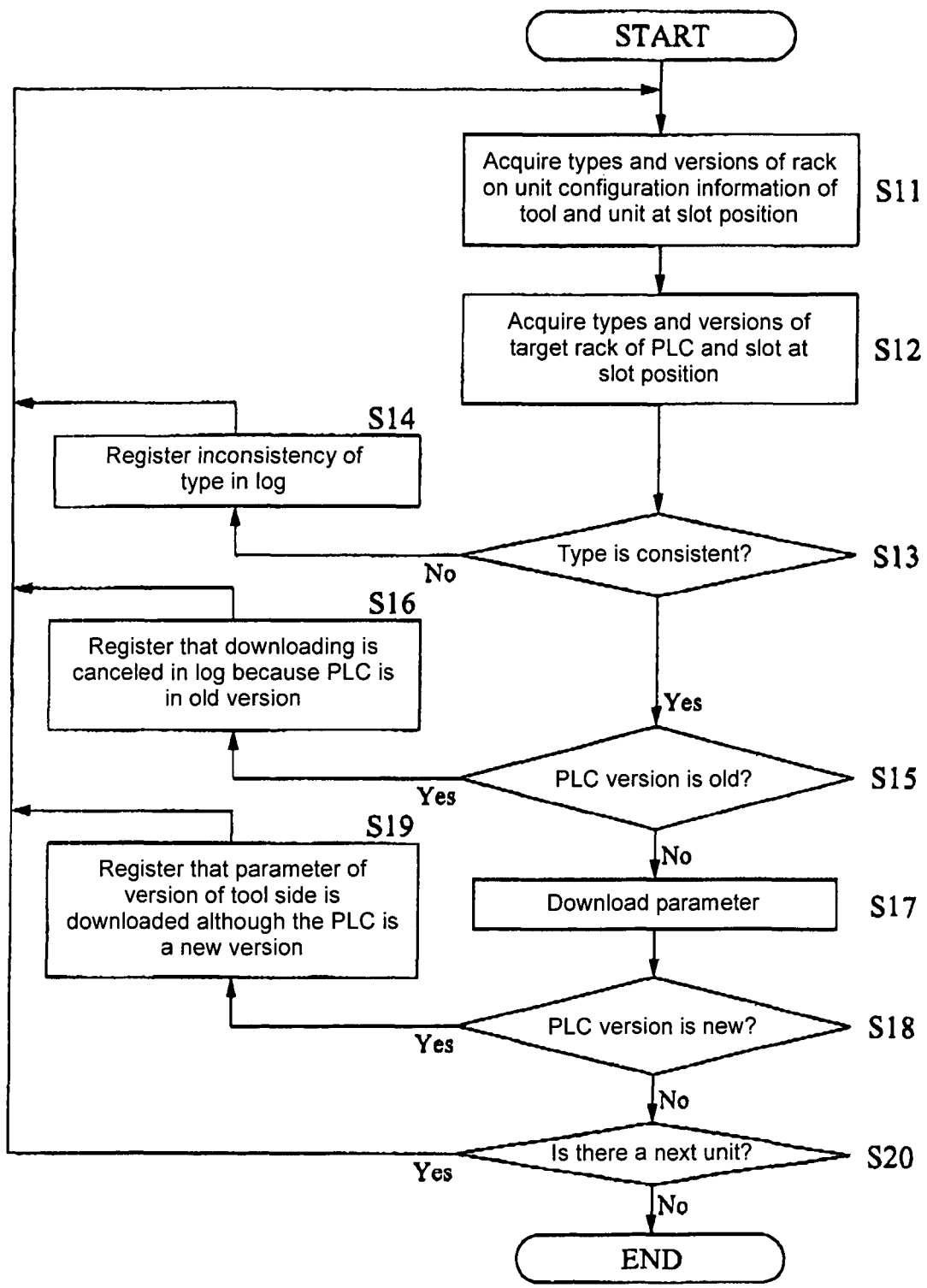
FIG. 12 is a flow chart showing the function of CPU.

Such processing is carried out in processing step S6. More specifically, the CPU 13 executes the flow chart shown in FIG. 12. That is, first, the type and version of the rack on the unit configuration information created by the PLC tool unit 10 and the unit at a slot position are acquired (S11). Next, the type and version of a target rack of the PLC system 20 and the unit at a slot position are acquired (S12).

Whether or not the type is consistent is determined (S13). Unless the unit set up at the position of each slot created by the PLC unit 10 meets the unit type of the actual PLC system 20, the parameters cannot be set up because the setting or assembly of the actual machine is mistaken. Thus, this event is registered in log as "type inconsistent" (S14) and the procedure returns to processing step S11.

If the type is consistent, the version is checked. First whether or not the version of the PLC is older than the version set up by the tool unit 10 is determined (S15) and if the version of the actual PLC is older, this falls under the rule (3) and thus no parameter is set up. Then, a fact that "the version of the PLC is not downloaded because it is old version" is registered in log (S16) and the procedure returns to processing step S11.

If the version of the PLC is not older than the version of the tool unit 10, determination at the processing step S15 turns to Yes and because this falls under (1) or (2), the parameter set up using the updated machine type information definition file possessed by the PLC tool unit 10 is downloaded to the PLC unit to be set up (S17). Although the parameter is downloaded in any case of (1) and (2), if the version is inconsistent (rule (1)), it is preferable to notify user of that phenomenon.

After downloading, whether or not the version of the PLC is newer than the version of the tool unit 10 is determined (S18). If the version of the actual machine is newer than the version of the tool unit 10, the determination of the processing step S18 turns to Yes and a fact that "the parameter of the version of tool side is downloaded although the PLC is in new version" is registered in log (S19) and the procedure returns to processing step S11.

If the versions of the actual machine and PCL tool unit 10 meet each other, the determination of the processing step S18 turns to No and this event falls under the rule (2) because the version of the unit to be set up of the PLC and the version of the tool unit 10 are identical, so that it comes that the parameter can be set up properly. Then, the procedure proceeds to processing step S20, in which whether or not there is a next step is determined and if so, the procedure returns to S11, in which the above-described processing is repeated and unless there is a next step, the procedure is ended.

Another embodiment enables the parameter of each unit to be changed without transmitting configuration information or all parameters to the PLC in batch. In such a case, a unit for editing the parameter is selected and its edit function is executed. Prior to executing the edit function, the version information of the PLC unit is acquired and the processing is switched by comparing with the version of the PLC tool unit 10.

(1)' If the version of the PLC tool unit 10 is older than the version of the PLC side, the parameter edit screen is displayed based on the version of the PLC tool unit 10 (using upper compatibility). That is, a parameter edit screen using the updated machine type information definition file possessed by the PLC tool unit 10 is displayed to set up the parameter.

(2)' If the version of the PLC tool unit 10 meets the version of the PLC, the parameter edit screen of the PLC tool unit 10 (updated version of the same as the parameter input screen of (1)' described above) is displayed.

(3)' If the version of the PLC tool unit 10 is newer than the version of the PLC, the parameter edit screen is displayed by switching the version of the PLC tool unit 10 to a definition file of the PLC version. That is, the PLC tool unit 10 displays the parameter edit screen using machine type information definition file which meets the PLC version without using the updated machine type information definition file in order to set up the parameter.

If the version of the PLC tool unit 10 is old, the parameter edit screen is displayed with current version of the PLC tool unit 10 in order to guarantee the upper compatibility like the batch transmission described above. Conversely, if the version of the PLC tool unit 10 is newer than the version of the PLC, the parameter edit screen based on the machine type information definition file of the updated version of the PLC tool unit 10 should not be displayed because the down compatibility is not guaranteed. In such a case, because machine type information definition files of different version although of the same type are stored in the unit information storage 15 of the PLC tool unit 10 for each of the units, the same version as the PLC version may be retrieved. Because "0" is registered in the machine type information definition file of the old version on the above table stored in the unit information storage 15, the version of the PLC tool unit 10 is retrieved from it and changed to the same as the version of the PLC and the parameter edit screen can be displayed by using the machine type information definition file of that version.

A modification of the embodiment will be explained by assuming a case. That case is that user builds up system and designs configuration information of the PLC tool unit 10 and starts the operation of the system. Assume that the PLC unit is in trouble and when that unit is replaced, a unit after the replacement has a version updated from the unit before the replacement. In this case, sometimes, the parameter setting information of the old version set before the replacement may be required to be transmitted to the PLC unit of the new version after the replacement. This is because the PLC unit after the replacement can satisfy a demand if it executes the same operation as the version before the replacement even if it is in the new version. Although difference may occur in the parameters due to difference of the version, those differences may be converted based on following rules.

(4) If the parameter increases after the replacement, an initial value is set up in the parameter. That is, if the parameters to be set up by the machine type information definition file of the new version which meets the unit after the replacement miss some parameters to be set up by the machine type information definition file of the old version before the replacement, the initial values are set at those parameters.

(5) If some parameters diminish after the replacement, those parameters are deleted. That is, the parameters which do not need to be set up by the machine type information definition file of the new version which meets the unit after the replacement (automatically set up) while it needs to be set up by the machine type information definition file of the old version before the replacement are deleted.

(6) If the data definition range differs although the parameters exist after the replacement, when a value not existing after the replacement is defined, it can be checked in the data range of the unit definition file, so that it is displayed in red on the parameter edit screen to notify user that it is improper data. That is, if part of the definition range of the parameter setting data by the machine type information definition file of the old version before the replacement is not contained in the definition range of the new version in the PLC tool unit 10, it cannot be set up and thus, this is notified to user.

Figure 13:
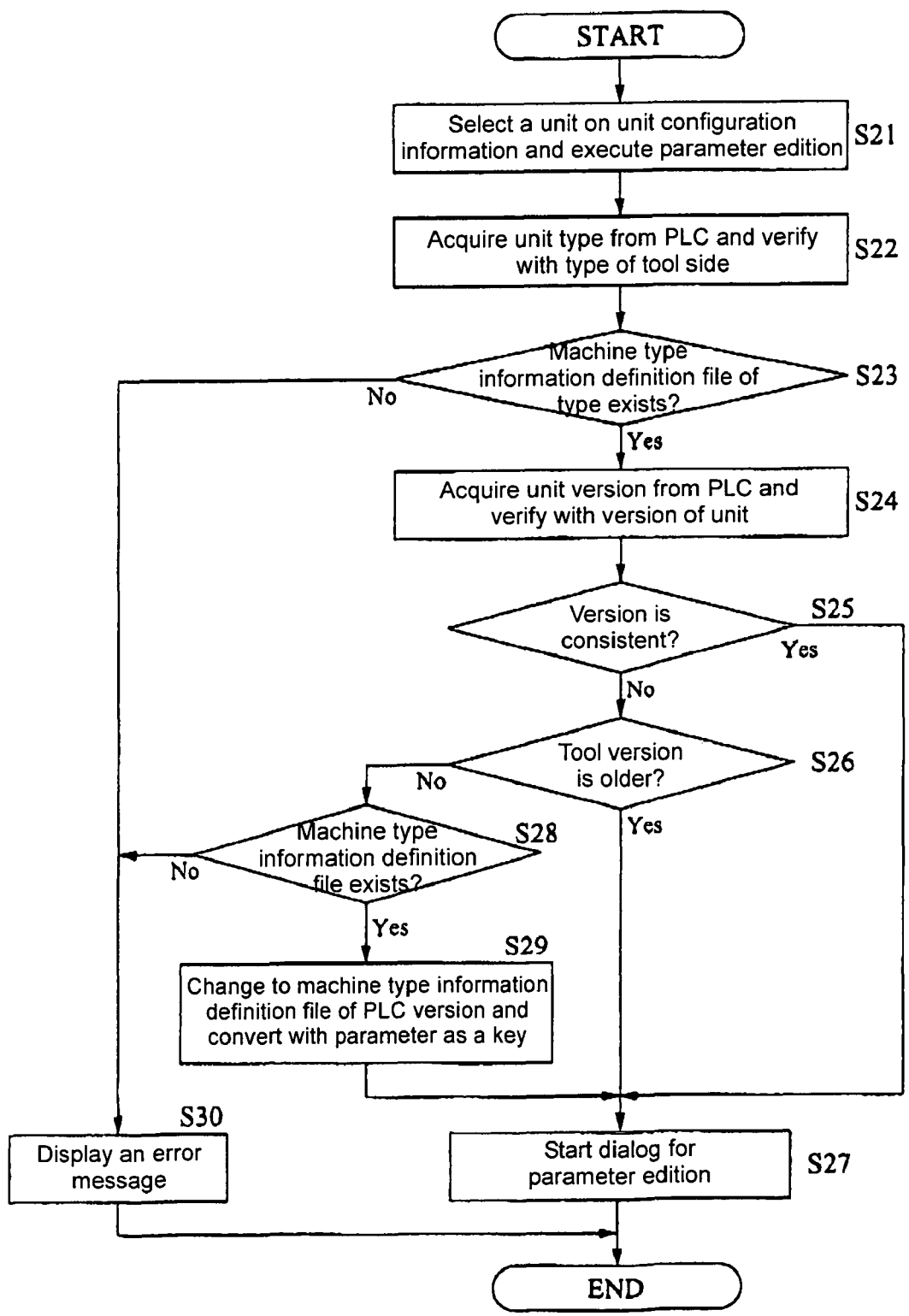
FIG. 13 is a flow chart showing the function of CPU.

These processings are executed according to the flow chart shown in FIG. 4 in processing step S7 and more specifically, the CPU 13 executes the flow chart shown in FIG. 13.

That is, a unit on the unit configuration information created by the PLC tool unit 10 is selected (clicked by user's operating the pointing device 11b) to execute the parameter edit processing (S21). Next, the type of a target rack of the PLC system 20 which is a corresponding actual machine and the unit at a slot position are acquired based on the target rack of a selected unit and the slot position to compare with the type of the PLC tool unit 10 (S22). Then, whether or not a machine type information definition file of the type exists is determined (S23). If no file exists, an error message is displayed (S30) and the processing is terminated. If the both types are not consistent, the determination of processing step S23 is No because no consistent machine type information definition file exists, so that the error message is displayed (S30) and the processing is terminated.

On the other hand, if a machine type information definition file exists, the unit version of the actual machine is acquired from the PLC and compared with the version of the PLC tool unit 10 (S24). Then, whether or not those versions are consistent is determined (S25). If the both versions are consistent, this falls under the above case (2)', so that a dialog for parameter edit based on the machine type information definition file of the updated version possessed by the current PLC tool unit 10 is started to execute the edit processing (S27). That is, a parameter input screen (parameter edit screen) for the updated version as shown in FIG. 10 is displayed to urge user to change the parameter or the like and finally, by clicking the "OK" button, the content of the edit processing is determined. Clicking the button "(E) for returning to the default setting" allows to return to the default setting. This is basically identical with a setting conducted at usual offline time executed in processing step S4. After this, the parameter after the edit is downloaded to the actual machine and set therein although this is not explained specifically.

On the other hand, unless the both versions are consistent (No in S25), whether or not the version of the PLC tool unit 10 is older is determined (S26). If the version of the PLC tool is older (Yes in S25), this event falls under the above case (2)' and thus, the dialog for the parameter edit based on the machine type information definition file of the updated version of the current PLC tool unit 10 is started to execute the edit processing (S27). That is, the parameter input screen (parameter edit screen) for the updated version as shown in FIG. 10 is displayed to urge user to change the parameter and finally, by clicking the "OK button", the content of the edit is determined. Further, clicking the button "(E) for returning to the default setting" allows to return to the default setting. This is basically identical with a setting conducted at the offline time executed in processing step S4. After this, a parameter after the edit is downloaded to the actual machine and set therein although this is not explained specifically. The processing of the PLC tool unit 10 is basically the same as when the versions are consistent.

On the other hand, if the version of the PLC tool unit 10 is newer (No in S26), the CPU 13 determines whether or not there exists a machine type information definition file corresponding to the version of the actual machine unit acquired in processing step S25 (S28). This determination is carried out by CPU 13's determining whether or not a machine type information definition file whose "type and version" are consistent is registered by referring to a table stored in the unit information storage 15. If a machine type information definition file corresponding to the version of the actual machine exists, the CPU 13 reads out a machine type information definition file of a corresponding version based on its machine type information definition file name (S29) and starts the dialog for parameter edit (S27). An example of the parameter edit screen (parameter input screen) displayed after such processing steps is shown in FIG. 14. Because this example shows a screen for the old version, there are no items of the third and fourth rows of the updated version shown in FIG. 10. Of course, a variety of cases may be considered, like changing of a range which can be set up as described above, as well as the case where the items disappear.

If no machine type information definition file corresponding to the version of the actual machine unit exists (No in S28), an error message is displayed (S30) and the processing is terminated. Although according to this embodiment, the machine type information definition file is prepared for each version and a machine type information definition file having a consistent version is read out to meet a unit of a different version (old version), the present invention is not restricted to this treatment but for example, it is permissible to store a changed content due to updating of the version and delete an item which the old version unit does not meet of a setting object based on the parameter edit screen (parameter input screen) of the updated version or change the setting range.

Although the content of the above description is executed in a case where the configuration information is designed on the personal computer subsequent to processing step S2, the present invention is not restricted to this example but the PLC tool unit 10 can acquire the configuration information and all unit parameters from the PLC which is connected so as to set and edit the parameter based on those data. This may be positioned as another embodiment.

The PLC tool unit 10 is connected to a target PLC online as shown in processing step S8 in the flow chart of FIG. 4 (S8). Then the type information and version information of a unit mounted on the PLC system connected online are acquired to recognize a unit configuration and a unit configuration information is displayed based thereon (S9). The screen displayed at this time is a basic configuration screen shown in FIG. 6. Because the unit configuration is unknown before the information from the PLC is uploaded despite the online connection, the unit is not yet set up like the processing step S2 and even if each rack is opened, the screen is displayed as shown in FIG. 7. By executing the processing step S10 to acquire the unit configuration information, the unit is set up at a predetermined slot as shown in FIG. 8.

Because the machine type information definition file which should be used in the PLC tool unit 10 upon setting or editing of the parameter can be specified because the version information has been acquired, if the parameter is set up by specifying a predetermined unit, the unit information storage 15 is accessed based on the type and version of the unit to acquire a corresponding machine type information definition file name and a corresponding file is read out based on that file name and then, predetermined parameter setting is executed.

The type and version of an acquired unit are not always installed in the PLC tool unit 10 and sometimes, there is a new unit not installed or the version of the PLC unit is not installed although the unit is installed (the type exists). Because in this case, the acquired unit cannot be restored accurately on the configuration diagram, user is notified of installing the definition file of a new unit or a new version through a message.

Figure 15:
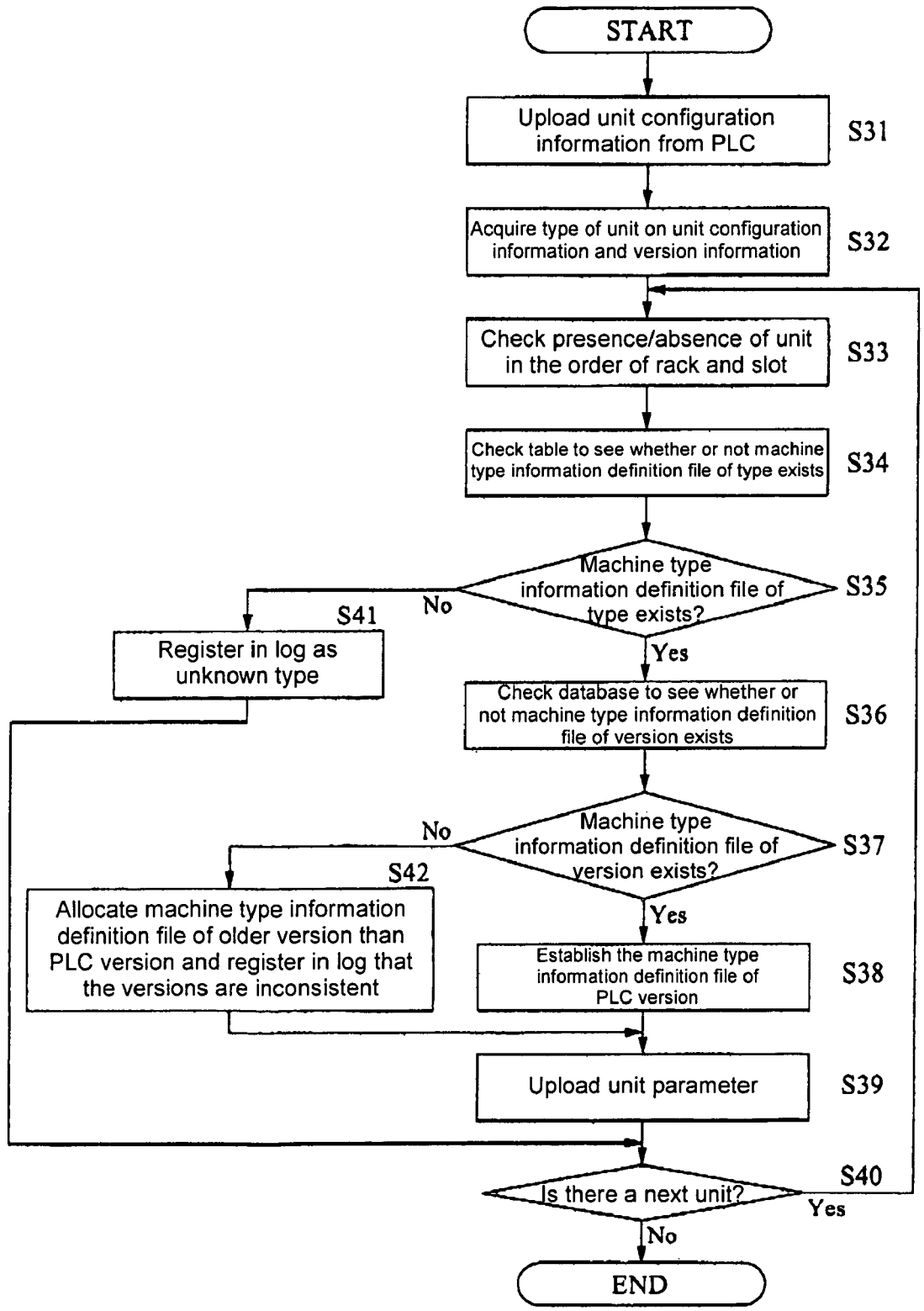
FIG. 15 is a flow chart showing the function of the CPU.

The above described processing is executed in processing step S10 in FIG. 4. More specifically, the CPU 13 executes the flow chart shown in FIG. 15. First, the unit configuration information is uploaded from the PLC system connected online (S31) to acquire a unit type and version information on the unit configuration information (S32). Presence or absence of a unit is checked in the order of rack and slot based on the acquired information (S33).

If a unit exists, the CPU 13 accesses a table stored in the unit information storage 15 to check whether or not any machine type information definition file of that unit type exists (S34). At this time, it does not check its version.

Then, whether or not any machine type information definition file of the type exists is determined as a result of executing the processing step S34 (S35). If the machine type information definition file of the type exists, next, whether or any machine type information definition file of the same version exists is checked (S36). Then, as a result of executing the processing step S36, whether or not a machine type information definition file of the same version of that type exists is determined (S37).

If the machine type information definition file of the same type and same version exists, the machine type information definition file of the version of that PLC is set up as a corresponding file. Then, a parameter set up in the unit of the actual machine is uploaded (S39). As a consequence, a parameter value of a parameter item specified by the machine type information definition file defined by processing step 38 to be set up is set up to the uploaded value. Then, whether or not a next unit exists is determined (S40) and if so, the procedure returns to the processing step 33 and the processing is continued.

On the other hand, if the determination of processing step 35 is No, that is, no machine type information definition file of the same type exists, it is registered in log as a unknown type (S41) and after that, the procedure jumps to processing step 40, in which whether or not a next step is present is determined.

If the determination of processing step 37 is No, that is, no machine type information definition file of the same version exists, a machine type information definition file of an older version than the current PLC version is allocated and a fact that its version is different is registered in log (S42). Then, the procedure jumps to processing step 39, in which a parameter set in the unit of the actual machine is uploaded. As a result, a parameter value of a parameter item which should be set up, the parameter value being specified by the machine type information definition file of the old version specified by processing step 42 is set up to the uploaded value. In the meantime, sometimes some parameter item uploaded does not meet the machine type information definition file because of its different version. In this case, that parameter is neglected. Then, whether or not a next unit exists is determined (S40) and if so, the procedure returns to processing step 33, in which the processing is continued.

The PLC tool unit 10 acquires parameter information about the unit configuration of the current PLC system by executing the above-described processing repeatedly and defines machine type information definition file necessary for editing that parameter information. Thus, upon executing the edit processing, the change/edit processing of the parameters can be carried out by displaying a parameter input screen (parameter edit screen) based on the machine type information definition file, changing the necessary parameter item like the above-described processing offline and downloading it.

In addition, it can be assumed that each PLC unit stores its machine type information definition file. Then, the PLC tool unit 10 may be constituted as comprising a device for determining whether or not machine type information definition file of a new version corresponding to the PLC unit is stored in the unit information storage 15, a device for uploading the machine type information definition file stored in each PLC unit from that unit if a determination result of the determining device is not stored, and a device for storing the machine type information definition file from each PLC unit into the unit information storage 15. As a consequence, even if the PLC unit has a new version, the PLC tool unit 10 can meet that new version.

What is claimed is:

1. A parameter setting device having a plurality of machine type definition file that defines a parameter for setting each of units constituting a programmable controller and being designed to set up a parameter for a unit having upper compatible in version based on the machine type definition file, comprising:

a means for displaying a parameter setting screen based on the machine type definition file corresponding to a unit for inputting a parameter for the unit;

a downloading means that executes a downloading of the parameter set with the parameter setting screen to the programmable controller including the unit;

a means for comparing a version of the machine type definition file with a version of the unit;

a means for displaying an error message when the downloading is prohibited;

wherein the means for downloading executes the downloading when the version of the machine type definition file with a version of the unit are same or the version of the unit is newer, while prohibiting the downloading when the version of the unit is older; and a means for acquiring a parameter set in the unit constituting the programmable controller by connecting to the programmable controller online, wherein the means for displaying the parameter setting screen checks the type and the version in the acquired parameter, displays an inquiry screen inquiring whether or not to adapt the version in the machine type definition file to the version in the acquired parameter when the type in the acquired parameter is same to the type in the machine type definition file and the version in the acquired parameter is older, and displays the parameter setting screen based on the machine type definition file which version corresponds to the version of the unit under a condition of a user approval for the inquiry.

2. The parameter setting device of claim 1, wherein the downloading means executes the downloading of the parameter to make the unit operate corresponding to the version of the machine type definition file without handling as an error when the version of the unit is newer.

3. The parameter setting device of claim 1 wherein the plurality of machine type definition file includes different versions of machine type definition files and the parameter is set with the machine type definition file corresponding to a newest machine type in the machine type definition files, and wherein the means for comparing compares a version of the machine type definition file with the version of the unit to be set up, prohibits the downloading when the version of the unit is older, retrieves the machine type definition file suitable for the unit from the plurality of machine type definition file, sets up the parameter based on the retrieved machine type definition file and executes the downloading of the parameter.

4. A parameter setting device that has a plurality of machine type information definition file corresponding to different versions of each of units constituting a programmable controller so as to set up a parameter to each of the units based on one of the plurality of machine type definition files, comprising:

a means for acquiring information about the machine type of the unit constituting the programmable controller by online-connecting to the programmable controller;

a means for specifying a corresponding machine type definition file from the plurality of machine type definition file based on the acquired machine type of the unit;

a means for displaying a parameter setting screen about the unit based on the specified corresponding machine type definition file;

a downloading means for executing a downloading of the parameter set with the parameter setting screen to the programmable controller including the unit; and a means for acquiring a parameter set in the unit constituting the programmable controller by connecting to the programmable controller online, wherein the means for displaying the parameter setting screen checks the type and the version in the acquired parameter, displays an inquiry screen inquiring whether or not to adapt the version in the machine type definition file to the version in the acquired parameter when the type in the acquired parameter is same to the type in the machine type definition file and the version in the acquired parameter is older, and displays the parameter setting screen based on the machine type definition file which version corresponds to the version of the unit under a condition of a user approval for the inquiry.

5. The parameter setting device of claim 4 designed to set up the parameter to the unit having a upper compatible version based on the machine type definition file;

wherein the plurality of machine type definition file includes different versions and the version of the corresponding machine type definition file is older than the version of the unit.

6. The parameter setting device of claim 4 designed to set up the parameter to the unit storing its machine type definition file based on the plurality of machine type definition file, further comprising:

a storage means for storing the plurality of machine type definition file corresponding to different versions of the unit;

a means for determining whether or not the version of the machine type definition file corresponding to the unit for setting parameter is stored in the storage means;

a means for uploading the machine type definition file stored in the unit when the result of the means for determination determines the version of the machine type definition file corresponding to the unit for setting parameter is not stored; and a means for displaying a parameter setting screen for the unit based on the machine type definition file acquired by the means for uploading.

7. A parameter setting device for setting a parameter to a unit based on a machine type definition file that defines the parameter for each type and each version of units constituting a programmable controller, comprising:

a means for displaying a parameter setting screen based on the machine type definition file of a predetermined version of the unit when editing the parameter to be set up in the unit;

a means for executing a downloading of the parameter set with the parameter setting screen to the programmable controller which includes the unit;

a means for controlling to compare the version of the unit used when the parameter is edited with the version of the unit at the downloading, to execute the downloading when the version of the unit used when the parameter is edited and the version of the unit are same or the version of the unit is newer and to prohibit the downloading when the version of the unit is older; and a means for acquiring a parameter set in the unit constituting the programmable controller by connecting to the programmable controller online, wherein the means for displaying the parameter setting screen checks the type and the version in the acquired parameter, displays an inquiry screen inquiring whether or not to adapt the version in the machine type definition file to the version in the acquired parameter when the type in the acquired parameter is same to the type in the machine type definition file and the version in the acquired parameter is older, and displays the parameter setting screen based on the machine type definition file which version corresponds to the version of the unit under a condition of a user approval for the inquiry.

8. A parameter setting device comprising:

a means for acquiring a type and a version of a unit constituting a programmable controller by connecting to the programmable controller online;

a means for specifying a machine type definition file corresponding to the unit based on the type and the version of the unit acquired by the means for acquiring;

a means for displaying a parameter setting screen based on the specified machine type definition file corresponding to the unit; and a means for acquiring a parameter set in the unit constituting the programmable controller by connecting to the programmable controller online, wherein the means for displaying the parameter setting screen checks the type and the version in the acquired parameter, displays an inquiry screen inquiring whether or not to adapt the version in the machine type definition file to the version in the acquired parameter when the type in the acquired parameter is same to the type in the machine type definition file and the version in the acquired parameter is older, and displays the parameter setting screen based on the machine type definition file which version corresponds to the version of the unit under a condition of a user approval for the inquiry.

9. The parameter setting device of claim 8, wherein the machine type definition file corresponding to the unit is of the same type as the unit which version is older than the version of the unit.

10. The parameter setting device of claim 9, wherein the means for displaying the parameter setting screen displays a default value stored in the machine type definition file for displaying the parameter setting screen.

11. The parameter setting device of claim 8, further comprising:

a means for acquiring a parameter set in the unit constituting the programmable controller by connecting to the programmable controller online, wherein the means for displaying the parameter setting screen checks the type and the version in the acquired parameter for displaying the parameter setting screen and prohibits to display as an error when the type in the acquired parameter is not same to the type in the machine type definition file.

12. The parameter setting device of claim 8, further comprising:

a means for acquiring a parameter set in the unit constituting the programmable controller by connecting to the programmable controller online, wherein the means for displaying the parameter setting screen checks the type and the version in the acquired parameter for displaying the parameter setting screen and for displaying the parameter setting screen without changing the version in the parameter setting device when the type in the acquired parameter is same to the type in the machine type definition file and the version in the acquired parameter is newer.

13. The parameter setting device of claim 8, further comprising:

a means for acquiring a parameter set in the unit constituting the programmable controller by connecting to the programmable controller online;

wherein the means for displaying the parameter setting screen checks the type and the version in the acquired parameter for displaying the parameter setting screen and displays the parameter setting screen based on the machine type definition file corresponding to the version of the unit when the type in the acquired parameter is same to the type in the machine type definition file are same and the version in the acquired parameter is older.

* * * * *